United States Patent
Smallman et al.

(10) Patent No.: US 8,590,643 B2
(45) Date of Patent: Nov. 26, 2013

(54) POLYCRYSTALLINE DIAMOND STRUCTURE

(75) Inventors: Clint Guy Smallman, London (GB); Moosa Mahomed Adia, Gauteng (ZA); Lai Hong Lai Sang, Gauteng (ZA)

(73) Assignees: Element Six Limited, County Clare (IE); Element Six Abrasives S.A., Luxembourg (LU)

( * ) Notice: Subject to any disclaimer, the term of this patent is extended or adjusted under 35 U.S.C. 154(b) by 374 days.

(21) Appl. No.: 12/962,433

(22) Filed: Dec. 7, 2010

(65) Prior Publication Data

US 2011/0132667 A1 Jun. 9, 2011

Related U.S. Application Data (60) Provisional application No. 61/267,215, filed on Dec. 7, 2009.

(51) Int. Cl.
*E21B 10/46* (2006.01)
*E21B 10/56* (2006.01)

(52) U.S. Cl.
CPC ............... *E21B 10/56* (2013.01); *E21B 10/46* (2013.01)
USPC .......................... 175/420.2; 175/433; 175/434

(58) Field of Classification Search
USPC ........................ 175/420.2, 433, 434
See application file for complete search history.

(56) References Cited

U.S. PATENT DOCUMENTS

| | | |
|---|---|---|
| 4,128,136 A | 12/1978 | Generoux |
| 4,311,490 A | 1/1982 | Bovenkerk et al. |
| 4,766,040 A | 8/1988 | Hillert et al. |
| 5,127,923 A | 7/1992 | Bunting et al. |
| 5,135,061 A | 8/1992 | Newton, Jr. |
| 5,238,074 A | 8/1993 | Tibbitts et al. |
| 5,266,388 A | 11/1993 | Santhanam et al. |
| 5,370,195 A | 12/1994 | Keshavan et al. |
| 5,645,617 A | 7/1997 | Frushour |
| 5,766,394 A | 6/1998 | Anderson et al. |
| 5,833,021 A | 11/1998 | Mensa-Wilmot et al. |
| 5,979,579 A | 11/1999 | Jurewicz et al. |

(Continued)

FOREIGN PATENT DOCUMENTS

| | | |
|---|---|---|
| EP | 0 699 642 A2 | 3/1996 |
| EP | 1 330 323 A2 | 7/2003 |

(Continued)

OTHER PUBLICATIONS

Blugan, G., et al., "Laminate Ceramics with Ultra-High Fracture Toughness," EMPA, 2002.

(Continued)

*Primary Examiner* — Cathleen Hutchins (74) *Attorney, Agent, or Firm* — Bryan Cave LLP (57) ABSTRACT

A PCD structure comprising a first region, in a state of residual compressive stress, and a second region in a state of residual tensile stress adjacent the first region; the first and second regions each formed of respective PCD grades and directly bonded to each other by intergrowth of diamond grains, the PCD grades having transverse rupture strength (TRS) of at least 1,200 MPa. A third region in a state of residual compressive stress may also be provided such that the second region is disposed between the first and third regions and is bonded to the first and third regions by intergrowth of diamond grains.

31 Claims, 6 Drawing Sheets

(56) References Cited

U.S. PATENT DOCUMENTS

| | | | |
|---|---|---|---|
| 6,068,913 A | 5/2000 | Cho et al. | |
| 6,187,068 B1 | 2/2001 | Frushour et al. | |
| 6,193,001 B1 | 2/2001 | Eyre et al. | |
| 6,258,139 B1 | 7/2001 | Jensen | |
| 6,290,008 B1 | 9/2001 | Portwood et al. | |
| 6,315,065 B1 | 11/2001 | Yong et al. | |
| 6,443,248 B2 | 9/2002 | Yong et al. | |
| 6,446,740 B2 | 9/2002 | Eyre | |
| 6,544,308 B2 | 4/2003 | Griffin et al. | |
| 6,592,985 B2 | 7/2003 | Griffin et al. | |
| 6,601,662 B2 | 8/2003 | Matthias et al. | |
| 6,655,481 B2 | 12/2003 | Findley et al. | |
| 6,779,951 B1 | 8/2004 | Vale et al. | |
| 2003/0176126 A1 | 9/2003 | Mulligan et al. | |
| 2006/0180354 A1 | 8/2006 | Belnap et al. | |
| 2006/0191723 A1 * | 8/2006 | Keshavan | 175/374 |
| 2006/0219439 A1 | 10/2006 | Shen et al. | |
| 2008/0142267 A1 | 6/2008 | Griffin et al. | |
| 2009/0090563 A1 | 4/2009 | Voronin et al. | |
| 2009/0152017 A1 | 6/2009 | Shen et al. | |
| 2009/0152018 A1 | 6/2009 | Sani et al. | |
| 2009/0166094 A1 | 7/2009 | Keshavan et al. | |
| 2009/0273224 A1 | 11/2009 | Hall et al. | |

FOREIGN PATENT DOCUMENTS

| | | |
|---|---|---|
| EP | 1 338 582 A2 | 8/2003 |
| EP | 1 932 947 A2 | 6/2008 |
| WO | 00/60137 A1 | 10/2000 |
| WO | 2004/106693 A2 | 12/2004 |
| WO | 2004/111284 A2 | 12/2004 |
| WO | 2007/144731 A2 | 12/2007 |
| WO | 2008/076420 A1 | 6/2008 |
| WO | 2008/096402 A1 | 8/2008 |
| WO | 2008/114228 A1 | 9/2008 |
| WO | 2009/024752 A2 | 2/2009 |
| WO | 2009/125355 A1 | 10/2009 |
| WO | 2010/135605 A2 | 11/2010 |
| WO | 2011/012708 A1 | 2/2011 |

OTHER PUBLICATIONS

Clegg, W., "Controlling cracks in ceramics," Science, 286:5442, Nov. 5, 1999, 1097-1099.

Karasawa, H., et al., "Development of new PCD bits for drilling of geothermal wells—Part 1: Laboratory Testing," J. Energy Resources Technology, 114, 1992, 323-331.

Miess, D., et al., "Fracture toughness and thermal resistance of polysrystalline diamond compacts," Mat. Sci. and Eng., A209, 1996, 270-276.

Lammer, "Mechanical properties of polycrystalline diamonds," Mat. Sci. and Technol., 4, 1988, 949-955.

Munz, et al., "Ceramics, mechanical properties, failure behaviour, materials selection," Springer, Berlin, 1999, 23-52.

Orlovskaya, N., et al., "Robust design and manufacturing of ceramic laminates with controlled thermal residual stresses for enhanced toughness," J. Mat. Sci., 40, 2005, 5483-5490.

Paggett et al., "Residual stress and stress gradients in polycrystalline diamond compacts," International Journal of Refractory Metals and Hard Materials, vol. 20, No. 3, 2002, pp. 187-194.

International Search Report for PCT/EP2010/007425 dated Mar. 22, 2011.

* cited by examiner

POLYCRYSTALLINE DIAMOND STRUCTURE

BACKGROUND

Embodiments of the invention relate to a polycrystalline diamond (PCD) structure, elements comprising same, method for making same and tools comprising same, particularly but not exclusively for use in rock degradation or drilling, or for boring into the earth.

PCD material comprises a mass of substantially intergrown diamond grains and interstices between the diamond grains. PCD may be made by subjecting an aggregated mass of diamond grains to an ultra-high pressure and temperature in the presence of a sintering aid such as cobalt, which may promote the inter-growth of diamond grains. The sintering aid may also be referred to as a catalyst material for diamond. Interstices within the PCD material may be wholly or partially filled with residual catalyst material. PCD may be integrally formed on and bonded to a cobalt-cemented tungsten carbide substrate, which may provide a source of cobalt catalyst material for sintering the PCD. As used herein, the term "integrally formed" regions or parts are produced contiguous with each other and are not separated by a different kind of material. Tool inserts comprising PCD material are widely used in drill bits used for boring into the earth in the oil and gas drilling industry. Although PCD material is extremely abrasion resistant, there is a need for PCD tool inserts that have enhanced fracture resistance.

PCT patent application publication number WO/2004/111284 discloses a composite material comprising a plurality of cores of PCD dispersed in a matrix comprising a PCD material of a grade different to that of the cores, and a suitable binder.

SUMMARY

Viewed from a first aspect, there can be provided a PCD structure comprising a first region in a state of residual compressive stress, and a second region adjacent the first region, the second region being in a state of residual tensile stress; the first and second regions each formed of respective PCD grades and directly bonded to each other by intergrowth of diamond grains; the PCD grades having transverse rupture strength (TRS) of at least 1,200 MPa.

Viewed from a second aspect, there can be provided a PCD structure having at least two compressed regions in respective compressive residual stress states and at least one tensioned region in a tensile residual stress state; the tensioned region disposed between and integrally formed with each of the compressed regions. The compressed regions may comprise at least a first and a third PCD grade and the tensioned region may comprise a second PCD grade, and at least the second PCD grade may have transverse rupture strength (TRS) of at least about 1,200 MPa. The second PCD grade may be selected to have a TRS of at least about 1,600 MPa or at least about 1,800 MPa.

Viewed from a third aspect, a method for making a PCD structure can be provided, the method including providing a first plurality of aggregate masses comprising diamond grains having a first mean size, at least one second aggregate mass comprising diamond grains having a second mean size; arranging the first and second aggregate masses in an alternating configuration to form a pre-sinter assembly; and treating the pre-sinter assembly in the presence of a catalyst material for diamond at an ultra-high pressure and high temperature at which diamond is more thermodynamically stable than graphite to sinter together the diamond grains and form an integral PCD structure.

A PCD element comprising a PCD structure bonded to a cemented carbide support body can be provided. A tool comprising a PCD element can also be provided. The tool may be a drill bit or a component of a drill bit for boring into the earth, or a pick or an anvil for degrading or breaking hard material such as asphalt or rock.

BRIEF INTRODUCTION TO THE DRAWINGS

Examples of PCD structures will now be described with reference to the accompanying drawings, of which.

The same references refer to the same general features in all the drawings.

DESCRIPTION

As used herein, polycrystalline diamond (PCD) is a superhard material comprising a mass of diamond grains, a substantial portion of which are directly inter-bonded with each other and in which the content of diamond is at least about 80 volume percent of the material. In one embodiment of PCD material, interstices between the diamond gains may be at least partly filled with a binder material comprising a catalyst for diamond. As used herein, "interstices" or "interstitial regions" are regions between the diamond grains of PCD material. In examples of PCD material, interstices or interstitial regions may be substantially or partially filled with a material other than diamond, or they may be substantially empty. Examples of PCD material may comprise at least a region from which catalyst material has been removed from the interstices, leaving interstitial voids between the diamond grains. As used herein, a catalyst material for diamond is a material capable of promoting the direct intergrowth of diamond grains.

As used herein, a PCD grade is a PCD material characterised in terms of the volume content and size of diamond grains, the volume content of interstitial regions between the diamond grains and composition of material that may be present within the interstitial regions. A grade of PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material.

Different PCD grades may have different microstructure and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

The table below shows approximate compositional characteristics and properties of three example PCD grades referred to as PCD grades I, II and III. All of the PCD grades comprise interstitial regions filled with material comprising cobalt metal, which is an example of catalyst material for diamond.

|  | PCD grade I | PCD grade II | PCD grade III |
| --- | --- | --- | --- |
| Mean grain size, microns | 7 | 11 | 16 |
| Catalyst content, vol. % | 11.5 | 9.0 | 7.5 |
| TRS, MPa | 1,880 | 1,630 | 1,220 |
| $K_1C$, MPa·$m^{1/2}$ | 10.7 | 9.0 | 9.1 |
| E, GPa | 975 | 1,020 | 1,035 |
| CTE, $10^{-6}$ mm/° C. | 4.4 | 4.0 | 3.7 |

Figure 1:
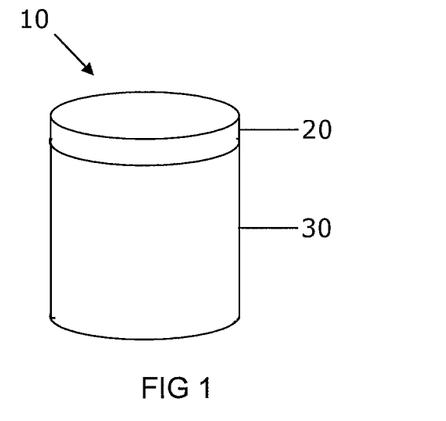
FIG. 1 shows a schematic perspective view of an example PCD cutter element for a drill bit for boring into the earth.

With reference to FIG. 1, an example of a PCD element 10 comprises a PCD structure 20 bonded or otherwise joined to a support body 30, which may comprise cemented tungsten carbide material. The PCD structure 20 comprises a PCD grade.

As used herein, the term "stress state" refers to a compressive, unstressed or tensile stress state. Compressive and tensile stress states are understood to be opposite stress states from each other. In a cylindrical geometrical system, the stress states may be axial, radial or circumferential, or a net stress state.

Figure 2:
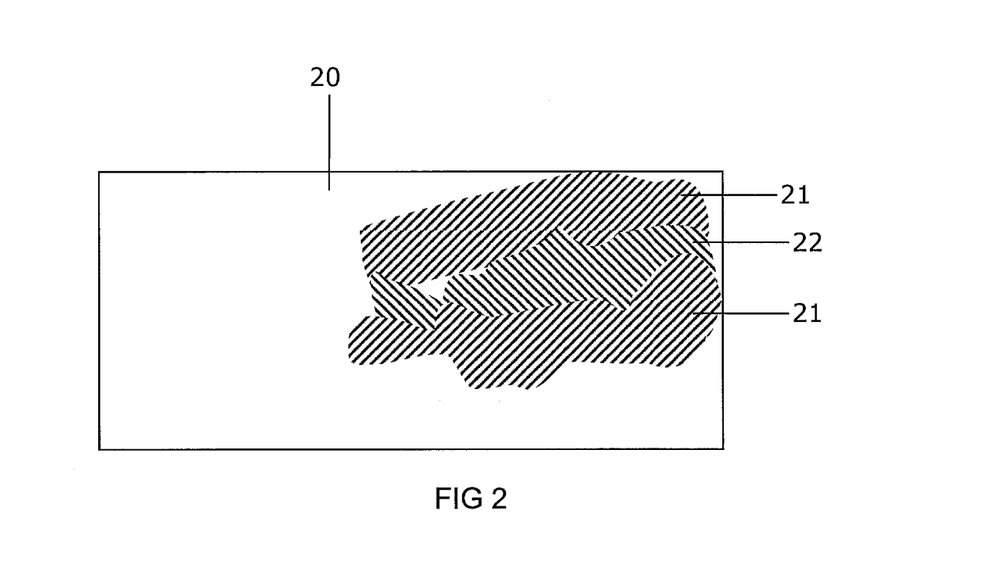
FIG. 2 shows a schematic cross-section view of an example of a portion of a PCD structure.

With reference to FIG. 2, an example of a PCD structure 20 comprises at least two spaced-apart compressed regions 21 in compressive residual stress states and at least one tensioned region 22 in a tensile residual stress state. The tensioned region 22 is located between the compressed regions 21 and is joined to them. The tensioned region 22 comprises PCD grade I and the compressed regions 22 comprise PCD grade III. In another variant, the tensioned region 22 comprises PCD grade II and the compressed regions 22 comprise PCD grade III.

PCD grades may be selected to achieve the configuration of a tensioned region between two compressed regions. For example, variations in mechanical properties such as density, elastic modulus, hardness and coefficient of thermal expansion (CTE) may be selected for this purpose. Such variations may be achieved by means of variations in content of diamond grains, content and type of filler material, size distribution or mean size of the PCD grains.

Figure 3:
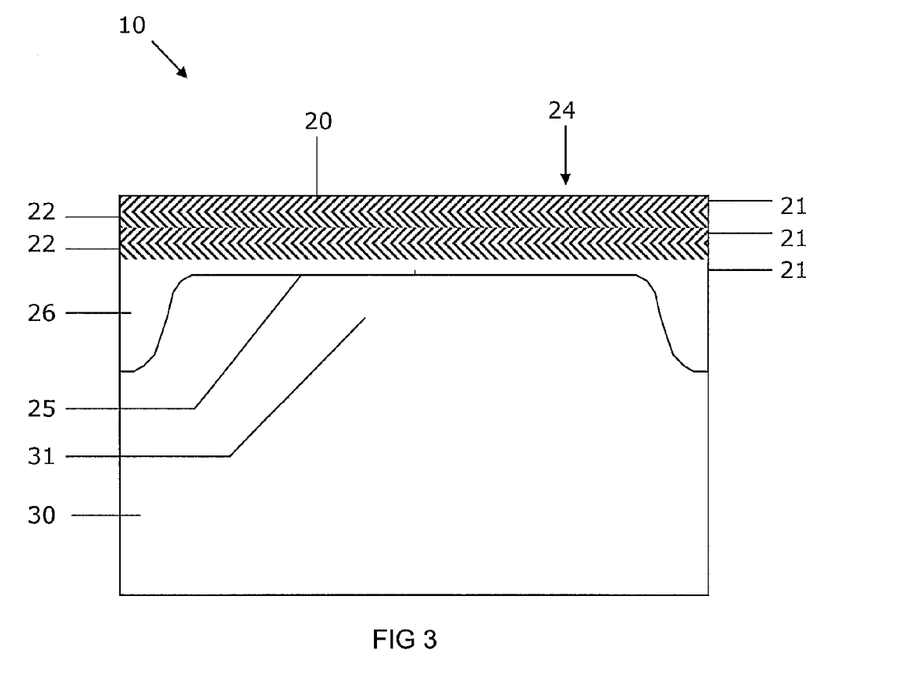
FIG. 3 shows a schematic longitudinal cross-section view of an example of a PCD element.

With reference to FIG. 3, an example of a PCD element 10 comprises a PCD structure 20 integrally joined to a cemented carbide support body 30. The PCD structure 20 comprises several compressed regions 21 and several tensioned regions 22 in form of alternating (or inter-leaved) strata or layers. The PCD element 10 may be substantially cylindrical in shape, with the PCD structure 20 located at a working end and defining a working surface 24. The PCD structure 20 may be joined to the support body 30 at a non-planar interface 25. The tensioned regions 22 comprise PCD grade II and the compressed regions 22 comprise PCD grade III. The compressed and tensioned regions 21, 22 have thickness in the range from about 50 microns to about 200 microns and may be arranged substantially parallel to the working surface 24 of the PCD structure 20. A substantially annular region 26 may be located around a non-planar feature 31 projecting from the support body 30, the annular region 26 comprising PCD grade II.

Figure 4:
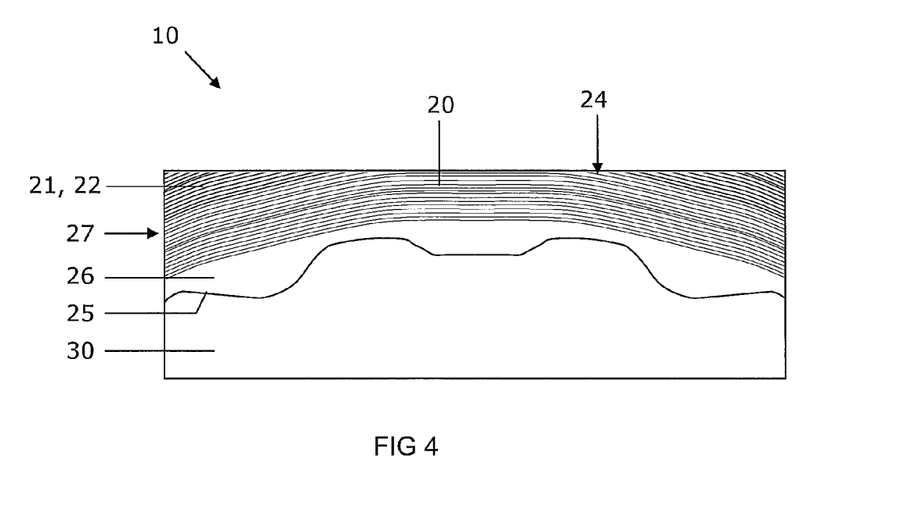
FIG. 4 shows a schematic longitudinal cross-section view of an example of a PCD element.

With reference to FIG. 4, an example of a PCD element 10 comprises a PCD structure 20 integrally joined to a cemented carbide support body 30 at a non-planar interface 25 opposite a working surface 24 of the PCD structure 20. The PCD structure 20 may comprise about 10 to 20 alternating compressed and tensioned regions 21, 22 in the form of extended strata. A region 26 that does not contain strata may be located adjacent the interface 25. The strata 21, 26 may be curved or bowed and yet generally aligned with the interface 25, and may intersect a side surface 27 of the PCD structure. Some of the strata may intersect the working surface 24.

Figure 5:
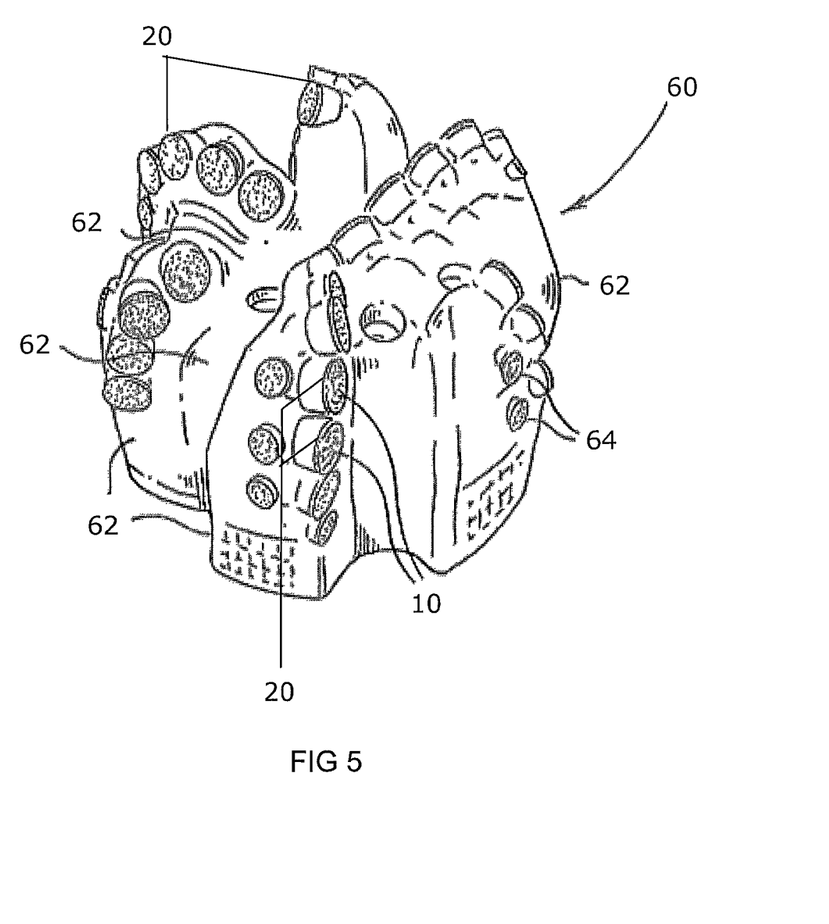
FIG. 5 shows a schematic perspective view of part of an example of a drill bit for boring into the earth.

With reference to FIG. 5, an example of a drill bit 60 for drilling into rock (not shown), comprising example PCD elements 10 mounted onto a bit body 62. The PCD elements 10 are arranged so that the respective PCD structures 20 project from the bit body 62 for cutting the rock.

An example method for making a PCD element is now described. Aggregate masses in the form of sheets containing diamond grains held together by a binder material may be provided. The sheets may be made by a method known in the art, such as by extrusion or tape casting methods, in which slurries comprising diamond grains having respective size distributions suitable for making the desired respective PCD grades, and a binder material is spread onto a surface and allowed to dry. Other methods for making diamond-containing sheets may also be used, such as described in U.S. Pat. Nos. 5,766,394 and 6,446,740. Alternative methods for depositing diamond-bearing layers include spraying methods, such as thermal spraying. The binder material may comprise a water-based organic binder such as methyl cellulose or polyethylene glycol (PEG) and different sheets comprising diamond grains having different size distributions, diamond content or additives may be provided. For example, at least two sheets comprising diamond having different mean sizes may be provided and first and second sets of discs may be cut from the respective first and second sheets. The sheets may also contain catalyst material for diamond, such as cobalt, and/or additives for inhibiting abnormal growth of the diamond grains or enhancing the properties of the PCD material. For example, the sheets may contain about 0.5 weight percent to about 5 weight percent of vanadium carbide, chromium carbide or tungsten carbide. In one example, each of the sets may comprise about 10 to 20 discs.

A support body comprising cemented carbide in which the cement or binder material comprises a catalyst material for diamond, such as cobalt, may be provided. The support body may have a non-planar end or a substantially planar proximate end on which the PCD structure is to be formed. A non-planar shape of the end may be configured to reduce undesirable residual stress between the PCD structure and the support body. A cup may be provided for use in assembling the diamond-containing sheets onto the support body. The first and second sets of discs may be stacked into the bottom of the cup in alternating order. In one version of the method, a layer of substantially loose diamond grains may be packed onto the uppermost of the discs. The support body may then be inserted into the cup with the proximate end going in first and pushed against the substantially loose diamond grains, causing them to move slightly and position themselves according to the shape of the non-planar end of the support body to form a pre-sinter assembly.

The pre-sinter assembly can be placed into a capsule for an ultra-high pressure press and subjected to an ultra-high pressure of at least about 5.5 GPa and a high temperature of at least about 1,300 degrees centigrade to sinter the diamond grains and form a PCD element comprising a PCD structure integrally joined to the support body. In one version of the method, when the pre-sinter assembly is treated at the ultra-high pressure and high temperature, the binder material within the support body melts and infiltrates the strata of diamond grains. The presence of the molten catalyst material from the support body is likely to promote the sintering of the diamond grains by intergrowth with each other to form an integral, stratified PCD structure.

In some versions of the method, the aggregate masses may comprise substantially loose diamond grains, or diamond grains held together by a binder material. The aggregate masses may be in the form of granules, discs, wafers or sheets, and may contain catalyst material for diamond and/or additives for reducing abnormal diamond grain growth, for example, or the aggregated mass may be substantially free of catalyst material or additives. In one version, the first mean size may be in the range from about 0.1 micron to about 15 microns, and the second mean size may be in the range from about 10 microns to about 40 microns. In one version, the aggregate masses may be assembled onto a cemented carbide support body.

Figure 6A:
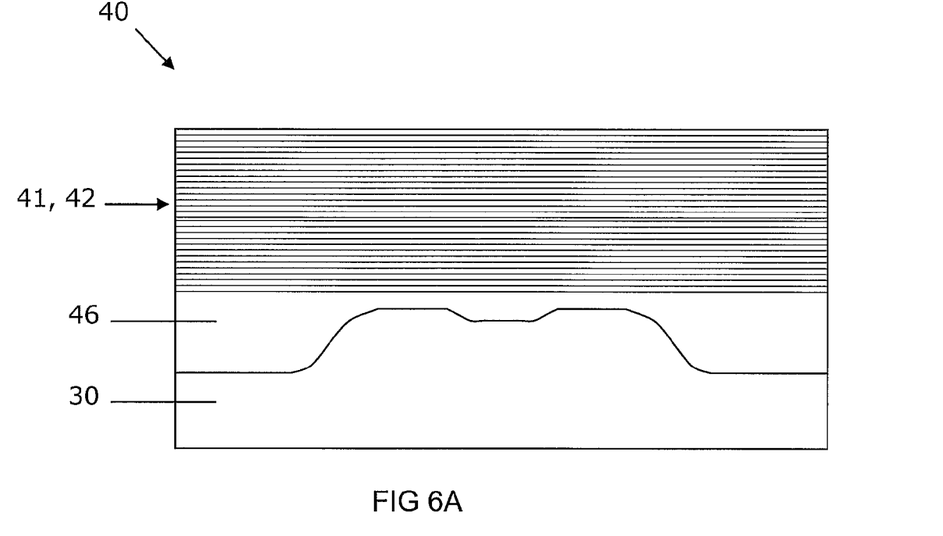
FIG. 6A shows a schematic longitudinal cross-section view of an example of a pre-sinter assembly for a PCD element.

With reference to FIG. 6A, an example of a pre-sinter assembly 40 for making a PCD element may comprise a support body 30, a region 46 comprising diamond grains packed against a non-planar end of the support body 30, and a plurality of alternating diamond-containing aggregate masses in the general form of discs or wafers 41, 42 stacked on the region 46. In some versions, the aggregate masses may be in the form of loose diamond grains or granules. The pre-sinter assembly may be heated to remove the binder material comprised in the stacked discs.

Figure 6B:
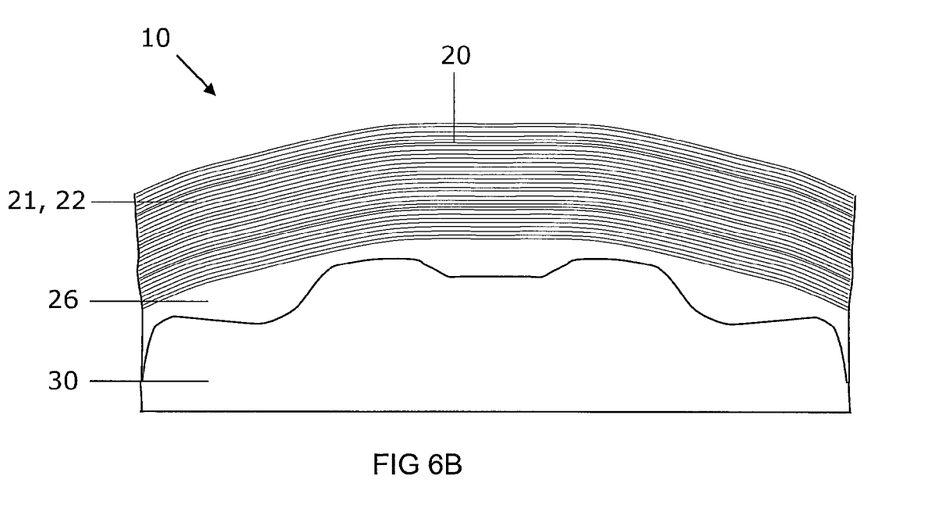
FIG. 6B shows a schematic longitudinal cross-section view of an example of a PCD element.

With reference to FIG. 6B, an example of a PCD element 10 comprises a PCD structure 20 comprising a plurality of alternating strata 21, 22 formed of different respective grades of PCD material, and a portion 26 that does not comprise strata. The portion 26 may be cooperatively formed according to the shape of the non-planar end of the support body 30 to which it has integrally bonded during the treatment at the ultra-high pressure. The alternating strata 21, 22 of different grades of PCD are bonded together by direct diamond-to-diamond intergrowth to form an integral, solid and stratified PCD structure 20. The shapes of the PCD strata 21, 22 may be curved, bowed or distorted in some way as a result of being subjected to the ultra-high pressure. In some versions of the method, the aggregate masses may be arranged in the pre-sinter assembly to achieve various other configurations of strata within the PCD structure, taking into account possible distortion of the arrangement during the ultra-high pressure and high temperature treatment.

The strata 21, 22 may comprise different respective PCD grades as a result of the different mean diamond grain sizes of the strata. Different amounts of catalyst material may infiltrate into the different types of discs 41, 42 comprised in the pre-sinter assembly since they comprise diamond grains having different mean sizes, and consequently different sizes of spaces between the diamond grains. The corresponding alternating PCD strata 21, 22 may thus comprise different, alternating amounts of catalyst material for diamond. The content of the filler material in terms of volume percent within the tensioned region may be greater than that within each of the compressed regions.

In one example, the compressed strata may comprise diamond grains having mean size greater than the mean size of the diamond grains of the tensioned strata. For example, the mean size of the diamond grains in the tensioned strata may be at most about 10 microns, at most about 5 microns or even at most about 2 microns, and at least about 0.1 microns or at least about 1 micron. In some embodiments, the mean size of the diamond grains in each of the compressed strata may be at least about 5 microns, at least about 10 microns or even at least about 15 microns, and at most about 30 microns or at most about 50 microns.

While wishing not to be bound by a particular theory, when the stratified PCD structure is allowed to cool from the high temperature at which it was formed, the alternating strata containing different amounts of metal catalyst material may contract at different rates. This may be because metal contracts much more substantially than diamond does as it cools from a high temperature. This differential rate of contraction may cause adjacent strata to pull against each other, thus inducing opposing stresses in them.

The PCD element 10 described with reference to FIG. 6B may be processed by grinding to modify its shape to form a PCD element substantially as described with reference to FIG. 4. This may involve removing part of some of the curved strata to form a substantially planar working surface and a substantially cylindrical side surface. Catalyst material may be removed from a region of the PCD structure adjacent the working surface or the side surface or both the working surface and the side surface. This may be done by treating the PCD structure with acid to leach out catalyst material from between the diamond grains, or by other methods such as electrochemical methods. A thermally stable region, which may be substantially porous, extending a depth of at least about 50 microns or at least about 100 microns from a surface of the PCD structure, may thus be provided. In one example, the substantially porous region may comprise at most 2 weight percent of catalyst material.

Figure 7A:
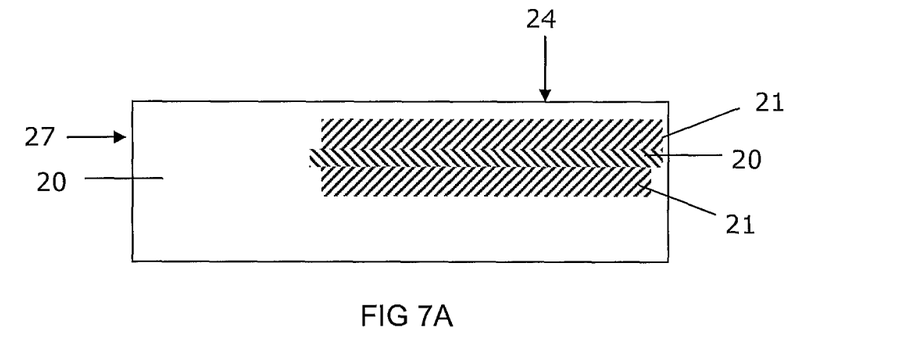
FIG. 7A, FIG. 7B, FIG. 7C and FIG. 7D show schematic cross-section views of parts of examples of PCD structures.

With reference to FIG. 7A, an example variant of a PCD structure 20 comprises at least three substantially planar strata 21, 22 strata arranged in an alternating configuration substantially parallel to a working surface 24 of the PCD structure 20 and intersecting a side surface 27 of the PCD structure.

Figure 7B:
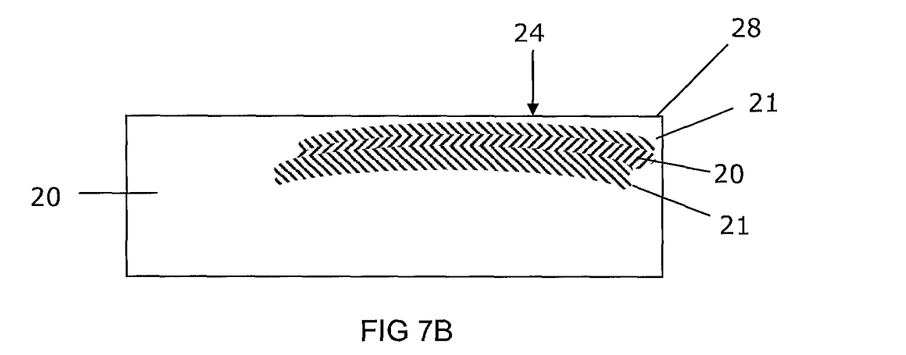

With reference to FIG. 7B, an example variant of a PCD structure 20 comprises at least three strata 21, 22 strata arranged in an alternating configuration, the strata having a curved or bowed shape, with at least part of the strata inclined away from a working surface 24 and cutting edge 28 of the PCD structure.

Figure 7C:
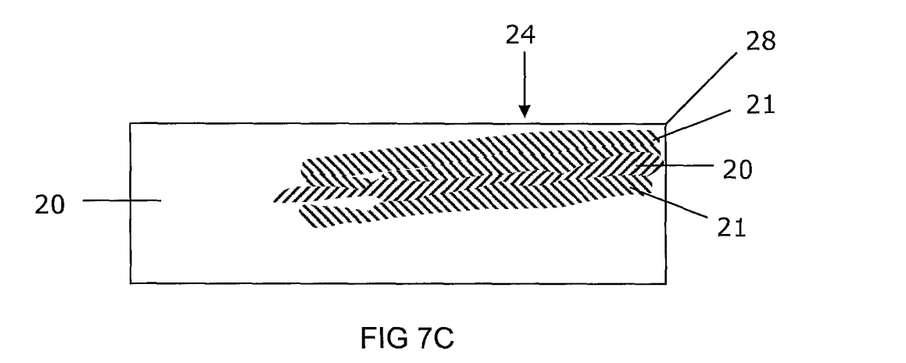

With reference to FIG. 7C, an example variant of a PCD structure 20 comprises at least three strata 21, 22 strata arranged in an alternating configuration, at least part of the strata inclined away from a working surface 24 of the PCD structure and extending generally towards a cutting edge 28 of the PCD structure.

Figure 7D:
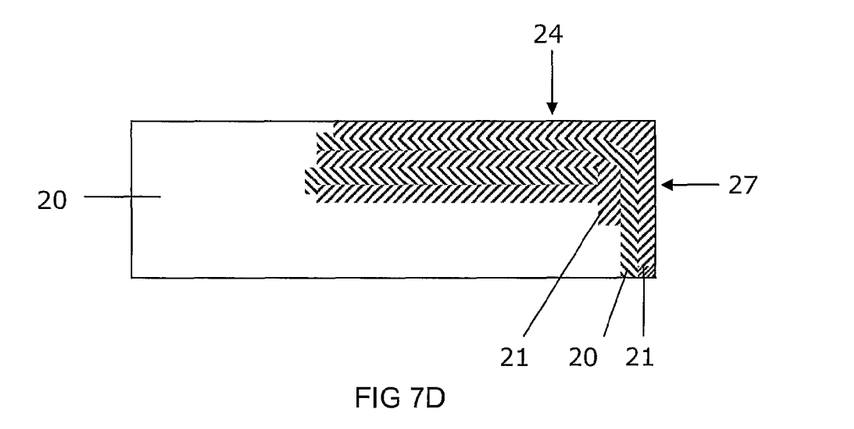

With reference to FIG. 7D, an example variant of a PCD structure 20 comprises at least three strata 21, 22 strata arranged in an alternating configuration, at least part of some of the strata being substantially aligned with a working surface 24 of the PCD structure and at least part of some of the strata generally aligned with a side surface 27 of the PCD structure. Strata may be generally annular of part annular and substantially concentric with a substantially cylindrical side surface 27 of the PCD structure 20.

Figure 8:
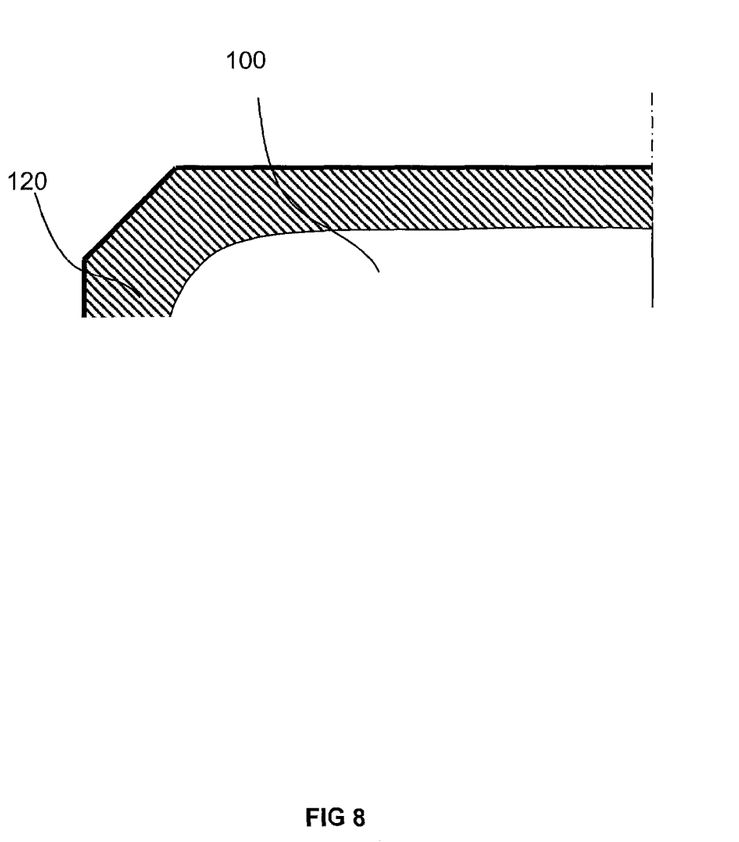
FIG. 8 shows a schematic longitudinal part cross-section view of an example of a PCD element.

With reference to FIG. 8, an example of a PCD structure comprises a tensioned region 100 in a tensile residual stress state and a compressed region 120 in a compressive residual stress state. The tensioned region 100 is located adjacent the compressed region 120 and is joined thereto. The tensioned region 100 comprises a first PCD grade, for example PCD grade I as described above and the compressed region 120 comprises a different PCD grade, for example PCD grade III as described above.

The PCD structure may have a surface region proximate a working surface, the region comprising PCD material having a Young's modulus of at most about 1,050 MPa, or at most about 1,000 MPa. The surface region may comprise thermally stable PCD material.

Some examples of PCD structures may have at least 3, at least 5, at least 7, at least 10 or even at least 15 compressed regions, with tensioned regions located between them.

Each stratum or layer may have a thickness of at least about 50 microns, at least about 100 microns, or at least about 200 microns. Each stratum or layer may have a thickness of at most about 500 microns. In some example embodiments, each stratum or layer may have a thickness of at least about 0.05 percent, at least about 0.5 percent, at least about 1 percent or at least about 2 percent of a thickness of the PCD structure measured from a point on a working surface at one end to a point on an opposing surface. In some embodiments, each stratum or layer may have a thickness of at most about 5 percent of the thickness of the PCD structure.

As used herein, the term "residual stress state" refers to the stress state of a body or part of a body in the absence of an externally-applied loading force. The residual stress state of a PCD structure, including a layer structure may be measured by means of a strain gauge and progressively removing material layer by layer. In some examples of PCD elements, at least one compressed region may have a compressive residual stress of at least about 50 MPa, at least about 100 MPa, at least about 200 MPa, at least about 400 MPa or even at least about 600 MPa. The difference between the magnitude of the residual stress of adjacent strata may be at least about 50 MPa, at least about 100 MPa, at least about 200 MPa, at least about 400 MPa, at least about 600 MPa, at least about 800 MPa or even at least about 1,000 MPa. In one example, at least two successive compressed regions or tensioned regions may have different residual stresses. The PCD structure may comprise at least three compressed or tensioned regions each having a different residual compressive stress, the regions arranged in increasing or decreasing order of compressive or tensile stress magnitude, respectively.

In one example, each of the regions may have a mean toughness of at most 16 MPa.m$^{1/2}$. In some embodiments, each of the regions may have a mean hardness of at least about 50 GPa, or at least about 60 GPa. Each of the regions may have a mean Young's modulus of at least about 900 MPa, at least about 950 MPa, at least about 1,000 or even at least about 1,050 MPa.

As used herein, "transverse rupture strength" (TRS) is measured by subjecting a specimen in the form of a bar having width W and thickness T to a load applied at three positions, two on one side of the specimen and one on the opposite side, and increasing the load at a loading rate until the specimen fractures at a load P. The TRS is then calculated based on the load P, dimensions of the specimen and the span L, which is the distance between the two load positions on one side. Such a measurement may also be referred to as a three-point bending test and is described by D. Munz and T. Fett in "Ceramics, mechanical properties, failure behaviour, materials selection" (1999, Springer, Berlin). The TRS corresponding to a particular grade of PCD material is measured measuring the TRS of a specimen of PCD consisting of that grade.

While the provision of a PCD structure with PCD strata having alternating compression and tensile stress states tends to increase the overall effective toughness of the PCD structure, this may have the effect of increasing the potential incidence of de-lamination, in which the strata may tend to come apart. While wishing not to be bound by a particular theory, de-lamination may tend to arise if the PCD strata are not sufficiently strong to sustain the residual stress between them. This effect may be ameliorated by selecting the PCD grades, and the PCD grade of which the tensioned region in particular is formed, to have sufficiently high TRS. The TRS of the PCD grade or grades of which the tensioned region is formed should be greater than the residual tension that it may experience. One way of influencing the magnitude of the stress that a region may experience is by selecting the relative thicknesses of adjacent regions. For example, by selecting the thickness of a tensioned region to be greater than that of the adjacent compressive regions is likely to reduce the magnitude of tensile stress within the tensioned region.

The residual stress states of the regions may vary with temperature. In use, the temperature of the PCD structure may differ substantially between points proximate a cutting edge and points remote from the cutting edge. In some uses, the temperature proximate the cutting edge may reach several hundred degrees centigrade. If the temperature exceeds about 750 degrees centigrade, diamond material in the presence of catalyst material such as cobalt is likely to convert to graphite material, which is not desired. Therefore, in some uses, the alternating stress states in adjacent regions as described herein should be considered at a temperature of up to about 750 degrees centigrade.

The $K_1C$ toughness of a PCD disc is measured by means of a diametral compression test, which is described by Lammer ("Mechanical properties of polycrystalline diamonds", Materials Science and Technology, volume 4, 1988, p. 23) and Miess (Miess, D. and Rai, G., "Fracture toughness and thermal resistances of polycrystalline diamond compacts", Materials Science and Engineering, 1996, volume A209, number 1 to 2, pp. 270-276).

Young's modulus is a type of elastic modulus and is a measure of the uni-axial strain in response to a uni-axial stress, within the range of stress for which the material behaves elastically. A preferred method of measuring the Young's modulus E is by means of measuring the transverse and longitudinal components of the speed of sound through the material, according to the equation $E=2\rho \cdot C_T^2(1+\upsilon)$, where $\upsilon=(1-2(C_T/C_L)^2)/(2-2(C_T/C_L)^2)$, $C_L$ and $C_T$ are respectively the measured longitudinal and transverse speeds of sound through it and $\rho$ is the density of the material. The longitudinal and transverse speeds of sound may be measured using ultrasonic waves, as is well known in the art. Where a material is a composite of different materials, the mean Young's modulus may be estimated by means of one of three formulas, namely the harmonic, geometric and rule of mixtures formulas as follows: $E=1/(f_1/E_1+f_2/E_2)$; $E=E_1^{f_1}+E_1^{f_2}$; and $E=f_1E_1+f_2E_2$; in which the different materials are divided into two portions with respective volume fractions of $f_1$ and $f_2$, which sum to one.

As used herein, the expression "formed of" means "consists of, apart from possible minor or non-substantial deviations in composition or microstructure".

The following clauses set out some of the combinations envisaged by the disclosure:

1. A PCD structure comprising a first region, a second region and a third region; the second region disposed between and bonded to the first and third regions by intergrowth of diamond grains; each region formed of a respective PCD grade having a TRS of at least 1,200 MPa or at least 1,600 MPa; the PCD grade comprised in the second region having a higher coefficient of thermal expansion (CTE) than the respective PCD grades of the first and third regions. The second region may comprise a PCD grade having a CTE of at least $4 \times 10^{-6}$ mm/° C.
2. A PCD structure comprising a first and a third region, each in a respective state of residual compressive stress, and a second region in a state of residual tensile stress and disposed between the first and third regions; the first, second and third regions each formed of respective PCD grades and directly bonded to each other by intergrowth of diamond grains; the PCD grades having transverse rupture strength (TRS) of at least 1,200 MPa.
3. A PCD structure comprising a first region, a second region and a third region; the second region disposed between and bonded to the first and third regions by intergrowth of diamond grains; each region formed of a respective PCD grade comprising at least 85 volume percent diamond grains having a mean size of at least 0.1 micron and at most 30 micron; the PCD grade comprised in the second region containing a higher content of metal than is contained in each of the respective PCD grades comprised in the first and in the third regions. The PCD grade comprised in the second region may contain at least 9 volume percent metal.
4. A PCD structure comprising a first region, a second region and a third region; the second region disposed between and bonded to the first and third regions by intergrowth of diamond grains; each region formed of a respective PCD grade having a TRS of at least 1,200 MPa; the PCD grade comprised in the second region containing more metal than is contained in each of the respective PCD grades comprised in the first and in the third regions. The PCD grade comprised in the second region may contain at least 9 volume percent metal.
5. In all of the combinations above numbered from 1 to 4, the PCD structure may comprise a thermally stable region extending a depth of at least 50 microns from a surface of the PCD structure; in which the thermally stable region comprises at most 2 weight percent of catalyst material for diamond.
6. In all of the combinations above numbered from 1 to 5, the regions may be in the form of strata arranged in an alternating configuration to form an integral, stratified PCD structure. The strata may have thickness of at least about 10 microns and at most about 500 microns, and the strata may be generally planar, curved, bowed or domed.
7. In all of the combinations above numbered from 1 to 6, the regions may intersect a working surface or side surface of the PCD structure. The PCD grade comprised in the first and third regions may comprise diamond grains having a different mean size than the diamond grains comprised in the second PCD grade.
8. In all of the combinations above numbered from 1 to 7, the volume or thickness of the second region may be greater than the volume or thickness of the first region and the volume or thickness of the third region.

A PCD element comprising a PCD structure bonded to a cemented carbide support body can be provided. The PCD element may be substantially cylindrical and have a substantially planar working surface, or a generally domed, pointed, rounded conical or frusto-conical working surface. The PCD element may be for a rotary shear (or drag) bit for boring into the earth, for a percussion drill bit or for a pick for mining or asphalt degradation.

PCD elements as described herein have the aspect of enhanced resistance to fracture.

A non-limiting example PCD element comprising alternating strata of two different grades of PCD was provided as follows.

First and second sheets, each containing diamond grains having a different mean size and held together by an organic binder were made by the tape casting method. This method involved providing respective slurries of diamond grains suspended in liquid binder, casting the slurries into sheet form and allowing them to dry to form self-supportable diamond-containing sheets. The mean size of the diamond grains within the first sheet was in the range from about 5 microns to about 14 microns, and the mean size of the diamond grains within the second sheet was in the range from about 18 microns to about 25 microns. Both sheets also contained about 3 weight percent vanadium carbide and about 1 weight percent cobalt. After drying, the sheets were about 0.12 mm thick. Fifteen circular discs having diameter of about 13 mm were cut from each of the sheets to provide first and seconds sets of disc-shaped wafers.

A support body formed of cobalt-cemented tungsten carbide was provided. The support body was generally cylindrical in shape, having a diameter of about 13 mm and a non-planar end formed with a central projecting member. A metal cup having an inner diameter of about 13 mm was provided for assembling a pre-sinter assembly. The diamond-containing wafers were placed into the cup, alternately stacked on top of each other with discs from the first and second sets interleaved. A layer of loose diamond grains having a mean size in the range from about 18 microns to about 25 microns was placed into the upturned cup, on top of the uppermost of the wafers, and the support body was inserted into the cup, with the non-planar end pushed against the layer.

The pre-sinter assembly thus formed was assembled into a capsule for an ultra-high pressure press and subjected to a pressure of about 6.8 GPa and a temperature of at least about 1,450 degrees centigrade for about 10 minutes to sinter the diamond grains and form a PCD element comprising a PCD structure bonded to the support body.

The PCD element was processed by grinding and lapping to form a cutter element having a substantially planar working surface and cylindrical side, and a 45 degree chamfer between the working surface and the side. The cutter element was subjected to a turret milling test in which it was used to cut a body of granite until the PCD structure fractured or became so badly worn that effective cutting could no longer be achieved. At various intervals, the test was paused to examine the cutter element and measure the size of the wear scar that had formed into PCD structure as a result of the cutting. The PCD cutter exhibited better wear resistance and fracture resistance that would be expected from a PCD material having the aggregate, non-stratified microstructure and properties of the component grades.

A cross-section through the PCD structure was also examined micro-structurally by means of a scanning electron microscope (SEM). Curved PCD strata were clearly evident, each stratum having thickness in the range from about 50 microns to about 70 microns.

The invention claimed is:
1. A polycrystalline diamond (PCD) structure comprising a first region in a state of residual compressive stress; a second region adjacent the first region, the second region being in a state of residual tensile stress; and a third region, the third region being in a state of residual compressive stress, the second region being disposed between the first and third regions, the second region being bonded to the first region and the third region by intergrowth of diamond grains; the first, second, and third regions each being formed of respective PCD grades having a transverse rupture strength (TRS) of at least 1,200 MPa; the PCD grade comprised in the second region having a higher coefficient of thermal expansion (CTE) than the PCD grade of the first region.

2. The PCD structure according to claim 1, wherein the PCD grade in the second region has a higher coefficient of thermal expansion (CTE) than the respective PCD grade of the third region.

3. The PCD structure as claimed in claim 2, in which the second region comprises a PCD grade having a CTE of at least $4 \times 10^{-6}$ mm/° C.

4. The PCD structure as claimed in claim 2, in which the regions are in the form of strata.

5. The PCD structure as claimed in claim 4, comprising a first set of one or more strata comprising a first grade of PCD material and a second set of strata comprising a second grade of PCD material; the first set of strata arranged in an alternating configuration with the second set of strata; and the strata bonded to each other by direct inter-growth of diamond grains to form an integral, stratified PCD structure.

6. The PCD structure as claimed claim 4, in which the strata have thickness of at least about 10 microns and at most about 500 microns.

7. The PCD structure as claimed in claim 6, in which the volume of the second region is greater than the volume of the first region and the volume of the third region.

8. The PCD structure as claimed in claim 7, in which the regions intersect a working surface or side surface of the PCD structure.

9. The PCD structure as claimed in claim 4, in which the strata are generally planar, curved, bowed or domed.

10. The PCD structure as claimed in claim 2, in which the PCD grade comprised in the first and third regions comprise diamond grains having different mean size than the diamond grains comprised in the PCD grade comprised in the second region.

11. The PCD structure as claimed in claim 2, in which the PCD grade comprised in the second region comprises a higher volume content of metal than contained in the PCD grades comprised in the first and third regions.

12. The PCD structure as claimed in claim 2, comprising a thermally stable region extending a depth of at least 50 microns from a surface of the PCD structure; in which the thermally stable region comprises at most 2 weight percent of catalyst material for diamond.

13. The PCD structure as claimed in claim 2, in which the region in a tensioned state comprises a PCD grade having a TRS of at least 1,600 MPa.

14. The PCD structure as claimed in claim 1, wherein the PCD grade of the second region has a lower modulus of elasticity than the PCD grade of the first region.

15. The PCD structure of claim 1, wherein each region is formed of a respective PCD grade comprising at least 85 volume percent diamond grains having a mean size of at least 0.1 micron and at most 30 micron; the PCD grade comprised in the second region containing a higher content of metal than is contained in each of the respective PCD grades comprised in the first and in the third regions.

16. The PCD structure as claimed in claim 15, in which the regions are in the form of strata.

17. The PCD structure as claimed claim 16, in which the strata have a thickness of at least about 10 microns and at most about 500 microns.

18. The PCD structure as claimed in claim 15, in which the PCD grade comprised in the second region contains at least 9 volume percent metal.

19. The PCD structure of claim 1, wherein the PCD grade comprised in the second region contains more metal than is contained in each of the respective PCD grades comprised in the first and in the third regions.

20. The PCD structure as claimed in claim 19, in which the regions are in the form of strata.

21. The PCD structure as claimed claim 20, in which the strata have thickness of at least about 10 microns and at most about 500 microns.

22. The PCD structure as claimed in claim 19, in which the PCD grade comprised in the second region contains at least 9 volume percent metal.

23. A polycrystalline diamond (PCD) element for a rotary shear bit for boring into the earth, for a percussion drill bit or for a pick for mining or asphalt degradation, comprising the PCD structure as claimed in claim 1 bonded to a cemented carbide support body.

24. A drill bit or a component of a drill bit for boring into the earth, comprising the PCD element as claimed in claim 23.

25. The PCD structure of claim 1, wherein the first, second, and third and additional regions form a plurality of alternating strata, the structure further comprising a portion that does not comprise strata, said alternating strata being bonded together by direct diamond-to-diamond intergrowth to form an integral, solid and stratified PCD structure.

26. The PCD structure of claim 25, further comprising a support body bonded to said portion along an interface.

27. The PCD structure of claim 26, wherein said interface is non-planar, said portion being cooperatively formed according to the shape of the non-planar interface with said support body.

28. The PCD structure of claim 25, wherein said strata are curved or bowed.

29. A method for making a PCD structure as claimed in claim 1, the method including providing a first plurality of aggregate masses comprising diamond grains having a first mean size, a second aggregate mass comprising diamond grains having a second mean size; and at least one third aggregate mass comprising diamond grains having a third mean size; arranging the first, second, and third aggregate masses in an alternating configuration to form a pre-sinter assembly with the second aggregate mass being disposed between the first and third aggregate masses; and treating the pre-sinter assembly in the presence of a catalyst material for diamond at an ultra-high pressure and high temperature at which diamond is more thermodynamically stable than graphite to sinter together the diamond grains and form an integral PCD structure.

30. The method as claimed in claim 29, in which the aggregate masses comprise diamond grains held together by a binder material.

31. The method as claimed in claim 29, in which the first mean size is in the range from 0.1 micron to 15 microns, and the second mean size is in the range from 10 microns to 40 microns.

* * * * *